United States Patent
Rony et al.

(10) Patent No.: US 11,494,053 B2
(45) Date of Patent: Nov. 8, 2022

(54) METHOD FOR OPERATING A COMPUTING DEVICE AND COMPUTING DEVICE IMPLEMENTING THE LATTER

(71) Applicant: LITHIUM MEDIA, Paris (FR)

(72) Inventors: Paul Rony, Paris (FR); Jean-François Didelot, Boulogne Billancourt (FR)

(73) Assignee: LITHIUM MEDIA, Paris (FR)

( * ) Notice: Subject to any disclaimer, the term of this patent is extended or adjusted under 35 U.S.C. 154(b) by 5 days.

(21) Appl. No.: 16/649,165

(22) PCT Filed: Sep. 24, 2018

(86) PCT No.: PCT/FR2018/000221
§ 371 (c)(1),
(2) Date: Mar. 20, 2020

(87) PCT Pub. No.: WO2019/058036
PCT Pub. Date: Mar. 28, 2019

(65) Prior Publication Data
US 2020/0293157 A1    Sep. 17, 2020

(30) Foreign Application Priority Data
Sep. 22, 2017   (FR) ...................................... 1771005

(51) Int. Cl.
*G06F 3/0482*    (2013.01)
*G06F 9/451*    (2018.01)
*G06F 3/04815*    (2022.01)

(52) U.S. Cl.
CPC ........ *G06F 3/0482* (2013.01); *G06F 3/04815* (2013.01); *G06F 9/451* (2018.02); *G06F 2203/04806* (2013.01)

(58) Field of Classification Search
CPC ...... G06F 3/0482; G06F 3/0481; G06F 9/451; G06F 3/04815; G06F 2203/04806
See application file for complete search history.

(56) References Cited

U.S. PATENT DOCUMENTS 5,768,578 A * 6/1998 Kirk ...................... G06F 16/954
6,188,405 B1 2/2001 Czerwinski et al.
(Continued)

FOREIGN PATENT DOCUMENTS

EP    3021205 A1    5/2016

OTHER PUBLICATIONS

Krottmaier, Harald et al., "Transclusions in the 21st Century." Journal of Universal Computer Science 7.12 (2001): 1125-1136.
(Continued)

*Primary Examiner* — William L Bashore
*Assistant Examiner* — Gregory A Distefano
(74) *Attorney, Agent, or Firm* — Leason Ellis LLP

(57) ABSTRACT

The operating method according to the invention is implemented in a computing device comprising a central processing unit, man-machine interface means including a display screen, and an operating system including a graphical user interface. The method comprises an implementation in the graphical user interface of a first metaphor in the form of a zoomable space (E3) appearing on the viewing screen and of a second metaphor in the form of a card (CT1, CT2) contained in the zoomable space, and a display in the cards of graphical representations corresponding to various types of digital objects as a function of a plurality of links between the objects and the cards, the plurality of links being established between the objects and the cards by at least some interactions via the graphical user interface between a user and the operating system.

15 Claims, 7 Drawing Sheets

(56) References Cited

U.S. PATENT DOCUMENTS

| | | | | |
|---|---|---|---|---|
| 6,968,511 | B1 * | 11/2005 | Robertson | G06F 3/048 |
| | | | | 715/205 |
| 8,386,929 | B2 * | 2/2013 | Zaika | G06Q 10/109 |
| | | | | 715/705 |
| 8,984,029 | B2 * | 3/2015 | Giampaolo | G06F 16/16 |
| | | | | 707/821 |
| 2001/0030662 | A1 * | 10/2001 | Ohkawa | G06F 3/0481 |
| | | | | 715/764 |
| 2003/0137522 | A1 * | 7/2003 | Kaasila | G06T 3/4015 |
| | | | | 345/619 |
| 2009/0315867 | A1 * | 12/2009 | Sakamoto | G06F 3/03547 |
| | | | | 345/184 |
| 2010/0083179 | A1 * | 4/2010 | Decker | G06F 3/0483 |
| | | | | 715/830 |
| 2012/0084689 | A1 * | 4/2012 | Ledet | G06F 3/0486 |
| | | | | 715/769 |
| 2013/0055125 | A1 | 2/2013 | Jackson et al. | |
| 2013/0137020 | A1 * | 5/2013 | Nagasaka | G03G 5/0596 |
| | | | | 430/56 |
| 2014/0098102 | A1 * | 4/2014 | Raffle | G02B 27/0172 |
| | | | | 345/440 |
| 2014/0165006 | A1 * | 6/2014 | Chaudhri | G06F 3/0487 |
| | | | | 715/835 |
| 2017/0235537 | A1 | 8/2017 | Liu et al. | |

OTHER PUBLICATIONS

Holman, David et al., "Organic user interfaces: designing computers in any way, shape, or form." Communications of the ACM 51.6 (2008): 48-55.

* cited by examiner

METHOD FOR OPERATING A COMPUTING DEVICE AND COMPUTING DEVICE IMPLEMENTING THE LATTER

CROSS-REFERENCE TO RELATED PATENT APPLICATIONS

This application is a U.S. National Stage Application under 35 U.S.C. § 371 of International Patent Application No. PCT/FR2018/000221, filed Sep. 24, 2018, which claims the benefit of priority of French Patent Application number 1771005 filed Sep. 22, 2017, both of which are incorporated by reference in their entireties. The International Application was published on Mar. 28, 2019, as International Publication No. WO 2019/058036 A1.

The invention generally refers to the operation of computing devices. More specifically, the invention refers to a method for operating a computing device. The invention also refers to a computing device in which the aforementioned operating method is implemented, as well as to a computer program product running on the aforementioned computing device and constituting the operating system of said device.

In the prior art, the operating systems of computing devices commonly make use of graphical user interfaces which use metaphors, such as the well-known metaphor of a desktop. Graphical interfaces have been designed to facilitate the user's interactions with the machine. Thus, the desktop corresponds to the total display surface of a display screen in which the user can open, close, move, or resize several display areas, called windows, by direct manipulation of the windows, typically by means of a mouse or a touch sensitive surface. Several activities and tasks are managed by the user through the various windows that are open on the desktop. The user goes from one window to the next to switch, for example, from a word processing application to an Internet browser or an entertainment application, or to search for information, files, or other items by successively opening a plurality of windows. Navigating through a large number of windows is annoying and results in definite mental fatigue, as humans have a limited short-term working memory. This customary graphical interface based on the use of a desktop and windows is no longer suitable for the wealth of multimedia digital life that is now accessible to users.

An alternative metaphor to conventional windows has been proposed with the so-called ZUI, Zoom User Interface. The ZUI was proposed for the first time by Benjamin B. Bederson and James D. Hollan in the article titled "Pad++: A Zoomable Graphical Interface," published in the proceedings of the "Conference Companion on Human Factors in Computing Systems," 1995. The ZUI provides the user with the possibility of navigating through his/her data without ever losing contact with the data, by forward and back zoom effects allowing the user to highlight detail levels of a specific area and to return to an initial display point of the data.

Current operating systems are based on a hierarchical approach to data organization. Files are contained in folders which are in turn contained in other folders. The hierarchical classification is useful for certain types of data, but it is poorly suited to the macroscopic organization of data in a computing device. Today, it is known that this type of classification runs contrary to the human mind, which works better with principles of association and location.

In his book titled "The invisible computer," MIT PRESS, 1998 (ISBN-10-0262140659), author Donald A. Norman underscores the highly "analog" nature of humans which puts them at odds with the digital world, and recommends a conception of computing devices centered around the operating modes of humans so as to facilitate their control of said devices and make the technical complexity as invisible as possible.

It therefore appears desirable to propose a new operating solution for computing devices that benefits from the advantages of the zoom user interface in order to provide the user with greater ease and comfort when using such devices.

According to a first aspect, the invention refers to a method for operating a computing device comprising a central processing unit, man-machine interface means including a display screen, and an operating system including a graphical user interface, said method comprising an implementation, in the graphical user interface, of a first graphical user interface metaphor in the form of a zoomable space appearing on the display screen and a second graphical user interface metaphor in the form of a card contained in the zoomable space, and a display in the cards of graphical representations corresponding to various types of digital objects as a function of a plurality of links between the objects and the cards, with the plurality of links being established between the objects and the cards by at least some interactions through the graphical user interface between a user and the operating system.

According to a particular feature of the method, the various types of digital objects comprise at least text and/or a 3D object and/or a sound and/or a video and/or a graphic and/or a spreadsheet.

According to another particular feature, the objects have corresponding graphical representations that reveal the type of object and/or its content.

According to yet another particular feature, the graphical user interface comprises a plurality of display modes corresponding to various zoom levels within the zoomable space, at least a first display mode allowing for macroscopic viewing of at least one card and/or a group of cards and/or a link between two cards, by means of a first cursor.

According to yet another particular feature, the graphical user interface comprises at least a second display mode making it possible to use the content of at least one card and/or a group of cards and/or an object, by means of a second cursor.

According to yet another particular feature, the graphical user interface comprises at least a third display mode allowing for read and/or edit access to the objects, by means of a third cursor.

According to yet another particular feature, the method also comprises an implementation of a second graphical user interface metaphor in the form of a tool palette that is displayed in the zoomable space according to the context in said at least one third display mode, with the tool palette comprising icons corresponding to software tools for interacting with the cards and objects according to user actions.

According to yet another particular feature, the method also comprises an implementation of a third graphical user interface metaphor in the form of a sub-tool palette being displayed in the zoomable space in said at least one third display mode, with the display of the sub-tool palette being controlled by a user action on a corresponding icon on the tool palette.

According to another aspect, the invention also refers to a computing device comprising a central processing unit, man-machine interface means including a display screen, and an operating system including a zoom user interface. In accordance with the invention, the computing device also comprises a plurality of means for implementing the operating method briefly described above, said plurality of means comprising an object system contained in a kernel of the operating system and including a library of objects, a database of objects, and a system of links managing a set of links between the library of objects and the database of objects, with the set of links consisting of hypertext links.

According to a particular feature, the plurality of means also comprises a transclusion database contained in the kernel of the operating system, which is associated with a version system, with the transclusion database ensuring an adequate transmission of the links between the objects, cards, and software tools.

According to another particular feature, the plurality of means also comprises software means for network communication, public transclusion, and sharing, which are contained in the kernel of the operating system and which are responsible for opening network communication ports, securing public transclusions, and sharing cards.

According to yet another particular feature, the zoom user interface is organic and makes use of means for software animation, scaling, and zoom effect management which are contained in the operating system.

According to yet another particular feature, the zoom user interface also makes use of software means for three-dimensional display, which are contained in the operating system.

According to yet another particular feature, the computing device comprises, in its operating system, software means comprising a plurality of programming interfaces.

According to yet another particular feature, the computing device comprises, in its operating system, software means for assisting with artificial intelligence.

The invention also refers to a computer program product constituting the operating system of the computing device briefly described above, comprising program code instructions implementing the method briefly described above when said instructions are executed by a processor of the computing device.

Other advantages and features of the present invention will become clear from a reading of the following detailed description of several particular embodiments of the invention, in reference to the appended drawings in which.

Figure 4A:
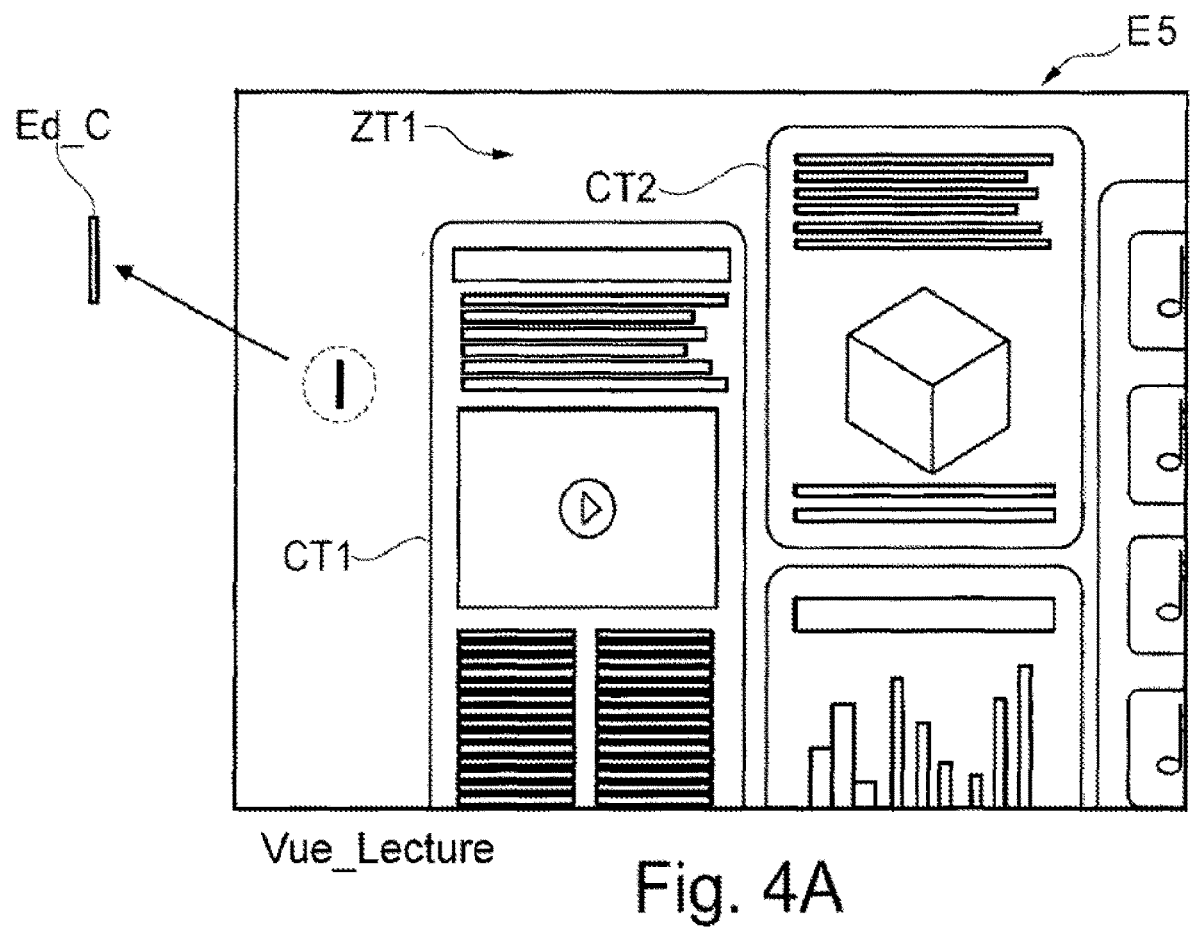
Figure 4B:
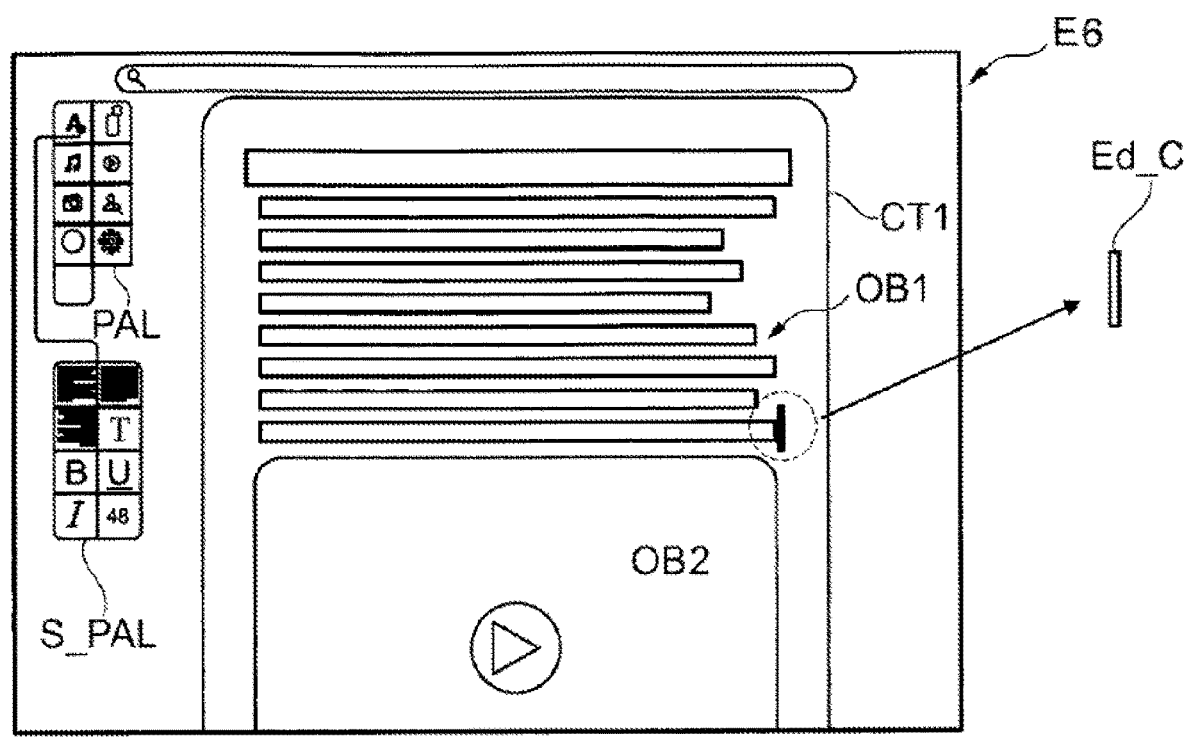
Figure 5A:
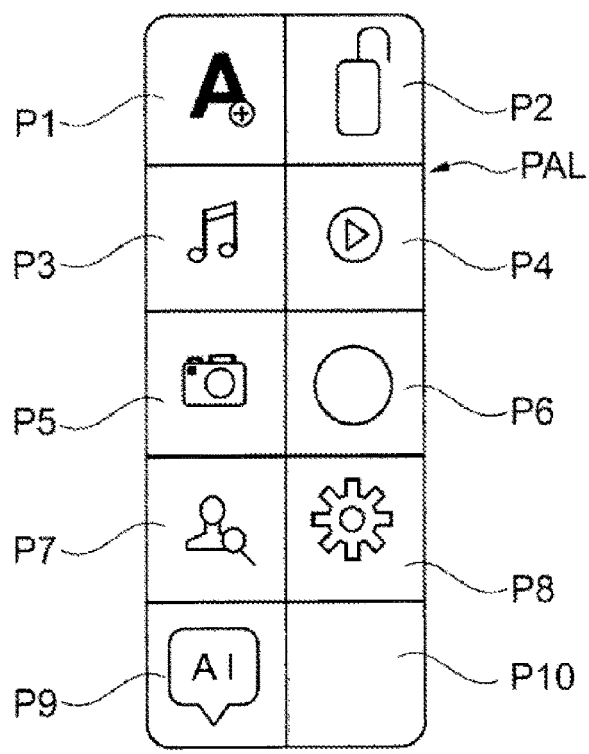
Figure 5B:
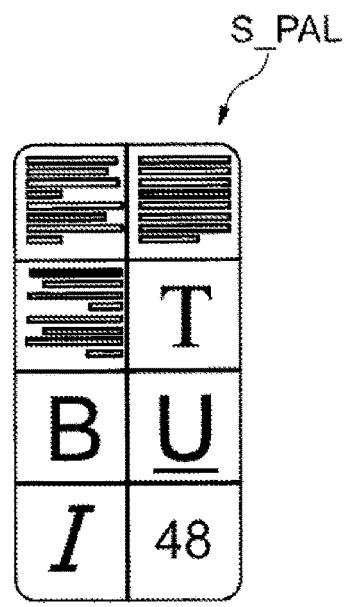

FIGS. 4A and 4B show a simplified representation of the fifth and sixth display examples corresponding to fifth and sixth display modes, with zoom levels of 80% and 100%, respectively, in a computing device according to the invention; and FIGS. 5A and 5B show examples a tool pallet and a sub-tool palette provided in the zoom user interface which is included in a computing device according to the invention.

The general hardware and software architecture of a particular embodiment 1 of a computing device according to the invention will now be described as an example, in reference to FIG. 1A. Here, computing device 1 occurs in the form of a general purpose computer in which is installed the computer program product according to the invention, which is the operating system referred to hereinafter as OS, of computing device 1. Note that the invention is not limited to the usage described here and may be implemented in other types of computing devices, such as tablet computers, smartphones, virtual reality or augmented reality headsets, etc.

Figure 1A:
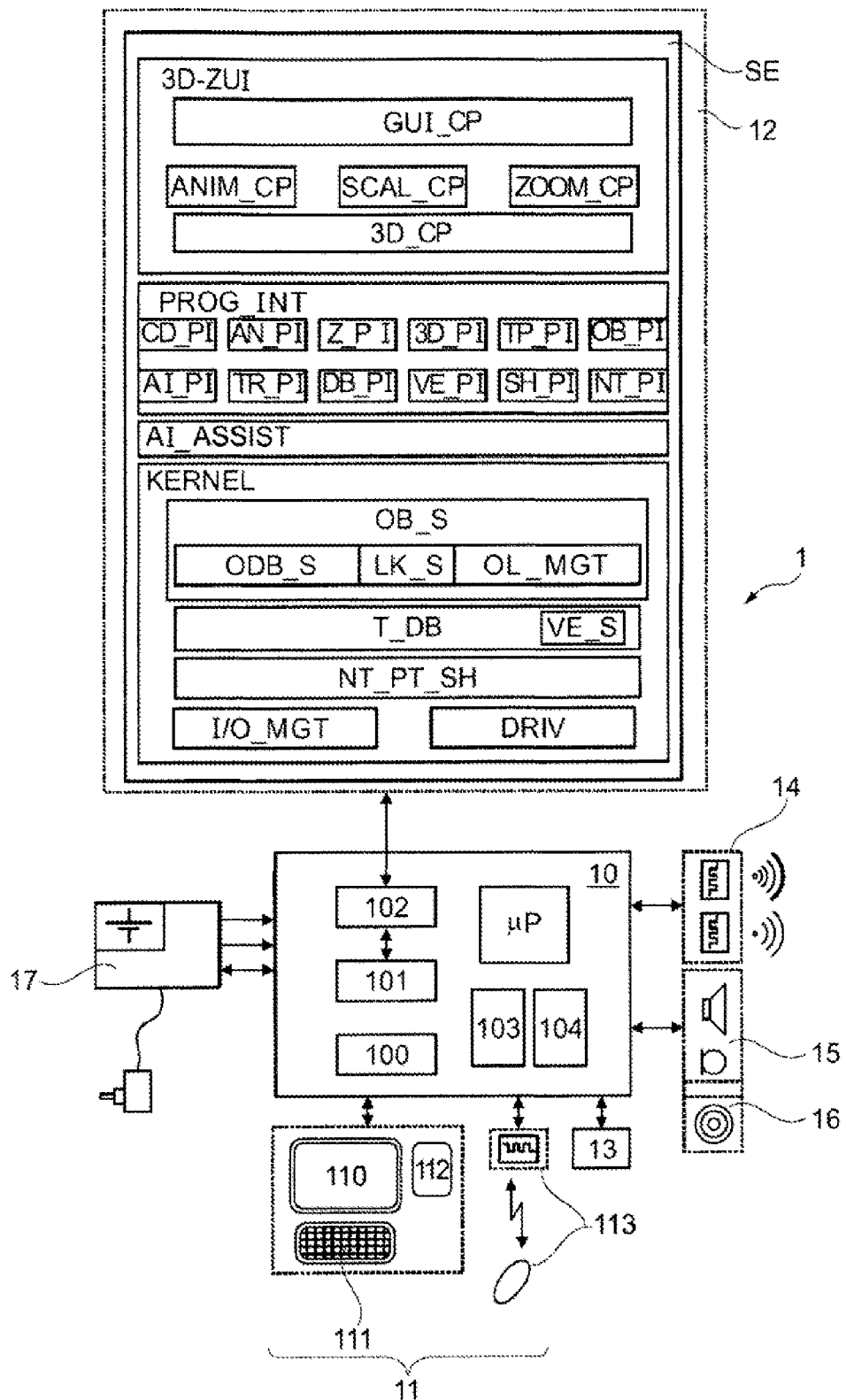
FIG. 1A is a block diagram showing the general hardware and software architecture of a particular embodiment of a computing device according to the invention.

As shown in FIG. 1A, computer 1 comprises, as is conventional, a central processing unit 10 with which are associated man-machine interface means 11, data storage means 12, input/output and network communication means 13, 14, and various auxiliary circuits and devices such as audio circuits 15 and a camera 16.

A power supply unit 17, comprising a rechargeable electric battery and an electric charger, are also provided as part of the electrical power supply of computer 1.

Central processing unit 10 is installed on a motherboard of the computer and comprises, as is conventional, a microprocessor µP, non-volatile ROM data storage 100, typically of the E2PROM type, volatile RAM data storage 101, typically of the DDR type, a memory controller 102, a peripheral interface 103, and an input/output interface 104.

Non-volatile storage 100 contains a BIOS (basic input/output system) that manages startup of central processing unit 10 and its basic inputs/outputs, prior to launching of operating system OS. Volatile RAM data storage 101 is the primary working memory of microprocessor µP. Memory controller 102 manages the rapid access of microprocessor µP to the memory resources which include, in particular, working random access memory 101 and data storage means 12. Typically, data storage means 12 are of the FLASH memory type and are in the form of an SSD mass data storage unit connected to an internal port of central processing unit 10. Operating system OS is installed here in mass data storage unit 12.

Peripheral interface 103 and input/output interface 104 manage data and signal exchanges between central processing unit 10 and means 11, 13, 14, 15, and 16 that are associated with it, particularly via an internal data communication bus (not shown) of central processing unit 10.

Man-machine interface means 11 comprise acquisition and return interfaces which here include a display screen 110, a keyboard 111, a graphical input device 112 such as a touch-sensitive surface, and a pointing and interaction device 113. Keyboard 111 may be a physical keyboard or a virtual keyboard displayed on the display surface of screen 110 when it is a touchscreen. According to the embodiment, touch-sensitive surface 112 is the display surface of screen 110 when this screen is a touchscreen or a touch-sensitive surface of a dedicated device. Pointing and interaction device 113 can typically be a wireless device with Six Degrees of Freedom (6DOF). In this embodiment, device 113 is a radio frequency (RF) link device.

Means 13 are typically external input/output ports, for example USB, Ethernet, HDMI, or other types of ports. Means 14 are Bluetooth (registered trademark) and Wi-Fi (registered trademark) RF transmitter/receiver modules.

Operating system OS according to the invention is shown in FIG. 1A in the form of a block diagram comprising essential software blocks that are needed for the operation thereof. Operating system OS comprises, in the upper layer, a software component 3D_ZUI which is the zoom user interface with its graphical and animation resources, a PROG_INT software component located beneath component 3D_ZUI and which contains various programming interfaces, a software component AI_ASSIST which is an artificial intelligence assistant, and a KERNEL software component which is the kernel of operating system OS. Artificial intelligence assistant AI_ASSIST is placed in the kernel of operating system OS, between programming interfaces PROG_INT and the KERNEL.

Contrary to the known operating systems of the prior art, which manage files associated with software applications, operating system OS according to the invention only recognizes objects that use one or more potentialities. In operating system OS, there is no file system as in known operating systems, which gives way to an object library. Operating system OS manages a multitude of objects distributed among databases and linked together by deep bidirectional hypertext links. Thus, for example, according to the invention a piece of text is not a text file ending with an extension such as ".txt," ".rtf," etc., as in known operating systems, but an object using a "text" potentiality managed by operating system OS. Objects may use a plurality of potentialities at the same time and are "marked" by operating system OS, which thus identifies the potentialities being used. For example, an object may be an audio recording and an object shown in three dimensions called a "3D object" hereinafter. Various potentialities may be placed in operating system OS, such as "text," "3D object," "sound," "video," "graphic," "spreadsheet," etc.

Known operating systems are essentially based on a hierarchical classification of files, the user interface with the desktop metaphor, or an application table as in smartphones. Operating system OS according to the invention is distinguished from the prior art by a new paradigm only aware of objects linked to each other by links and making use of the association of a zoom user interface and a system of card metaphors. The cards appear on the display surface of the zoom user interface as receptacles containing objects linked to each other and on which the user acts by means of software tools. The software tools can be actuated through a tool palette metaphor that is displayed when the card is zoomed to a level corresponding to an edit mode. Cards CT used in operating system OS are shown in FIGS. 2A, 2B, 3A, 3B, and 4A, 4B, and will be discussed in detail below. Tool palettes PAL and S_PAL are shown in FIGS. 4B, 5A, and 5B.

Preferably, the zoom user interface of operating system OS according to the invention is organic. This means that the interface is a mobile and flexible interface that adapts and changes its shape as a function of the information to be displayed. The zoom effect introduced into the zoom user interface provides an additional axis of movement that allows the cards to be positioned in a three-dimensional space. By default, the cards are displayed in an axonometric projection. However, a 3D display mode may be built into operating system OS, allowing the user to explore his/her data displayed in relief.

A card CT may receive any object, regardless of the type, and the user has the possibility of positioning the object in the card in the way he/she desires. Objects are stored on the card, which constitutes an interactive unit. Objects in the cards have graphical representations which reveal their type and/or content. In this way, the user is aware of the type and/or content of the object without having to open the object. Let us now refer, for example, to FIG. 4B, which shows a card CT1 including a "text" object OB1 and a "video" object OB2. In order to work with the objects of a card, the card simply needs to be zoomed in to cause tool palettes PAL and S_PAL to appear, thus authorizing actions on the objects. In addition, the user can gather several cards to create work zones or groups of linked cards, such as group ZT shown in FIG. 2A.

Note here that the architecture of operating system OS according to the invention completely does away with the "software application" entity which, together with the "file" entity, are at the heart of known operating systems. In operating system OS, the combination of palette and cards is what comes the closest to a software application in the conventional sense of the term, but this combination in actuality forms an interactive document.

In reference to FIG. 1A, software component 3D_ZUI forms the upper layer of operating system OS, that is, the layer that is visible and accessible to the user. Component 3D_ZUI comprises a graphical user interface software module GUI_CP, a software component for animation ANIM_CP, a software component for zoom effect management ZOOM_CP, a software component for scaling SCAL_CP, and a software component for three-dimensional display 3D_CP.

The combination of graphical user interface module GUI_CP and software components ANIM_CP, ZOOM_CP, and SCAL_CP allows operating system OS to provide functionalities of progressive zooming, card animation, and user browsing within a card, which can be seen with a pseudo-infinite variable scale within the display space.

Animation component ANIM_CP is the conductor of the animations in the graphical interface and handles the animation of the cards within the space and coordination of the animations. Component ANIM_CP manages the axes and all of the positions and movements of the cards and cursor, as well as their speed of movement. Component ANIM_CP also manages refreshes of the cards and their content as well as the pre-extraction of data from memory for faster loading of the data. Component ANIM_CP works jointly with components ZOOM_CP and SCAL_CP to make the card animations.

Component ZOOM_CP manages the scaling of cards CT and their content. The zoom and animation processing is done in parallel between the various software components that are linked by graphical user interface module GUI_CP. This multiplication of processes allows for greater responsiveness. If one of the components freezes, the other components are not affected. In this way, operating system OS only needs to restart the faulty component, which allows for better management of random access memory RAM. In addition, the user is inconvenienced less by a malfunction.

Component SCAL_CP handles scaling of the content and declares the possible states of interaction with cards CT, namely a modification, a display of the tool palette if necessary, and a change of state of the cursor.

Component SCAL_CP works in parallel with zoom effect component ZOOM_CP, which handles the graphical portion of the zoom. Component ZOOM_CP manages the so-called UI/UX "user interface/user experience" aspect, whereas component SCAL_CP converses with the system to prepare the appropriate tools in light of the scale chosen by the user. Thus, component SCAL_CP manages the scaling of cards CT, of the objects, and of the cursors in parallel and controls the display of tool palettes PAL and S_PAL.

Component 3D_CP manages the switching to 3D of the zoom user interface. When the user switches to 3D mode, the three intermediate components ANIM_CP, ZOOM_CP, and SCAL_CP stay in place, but component 3D_CP takes over their behavior and the execution of tasks incumbent upon them. Note that management of 3D objects is always handled by component 3D_CP, regardless of the mode of the zoom user interface.

Software component PROG_INT combines various programming interfaces CD_PI, AN_PI, Z_PI, 3D_PI, TP_PI, OB_PI, AJPI, TR_PI, DB_PI, VE_PI, SH_PI, and NT-PI.

Unlike the Application Programming Interfaces (APIs) of known operating systems, which generally only allow limited access to the system's resources, the programming interfaces of operating system OS, designated overall as xx_PI above, allow developers to have deep access to the system by authorizing calls to basic functions of operating system OS. Programming interfaces xx_PI encompass a theoretical representation of operating system OS, its key functions, and its operation.

In operating system OS according to the invention, a person working on the development of a program has the possibility of interfacing the program with the entire system thanks to programming interfaces xx_PI. Component PROG_INT can be used by a developer, for example, to add new functions to operating system OS. Programming interfaces xx_PI are also useful for creating new tools integrated into tool palettes PAL and S_PAL, or for adding new objects.

Interfaces CD_PI, AN_PI, Z_PI, and 3D_PI are card, animation, zoom effect, and 3D display programming interfaces, respectively, which manage the graphical portion of operating system OS. They allow developers to manage the card creation, scaling, zooming, and the 3D portion, for example, for interactive sets, and the appearance of tool palettes, pre-loading of objects, etc.

Interface TP_PI is a programming interface for tool pallets PAL and S_PAL. This interface, TP_PI, makes it possible to add tools to the standard tool palettes of operating system OS and is useful to developer when creating interactive card, palette, and tool sets. Interface TP_PI can also allow a developer to create a new tool for operating system OS or for a third-party set.

Interface OB_PI is an object programming interface. Interface OB_PI allows a developer to have access to one or more object libraries included in operating system OS and to add new objects to those libraries. Using interface OB_PI in conjunction with card programming interface CD_PI makes it possible to manage objects on a card and to create a set consisting of a card and objects. By also using the programming interface of tool palette TP_PI, a developer can create a set of a card, tool palettes, and objects.

Interface AI_PI is an artificial intelligence programming interface that allows a developer to have access to the functions provided by the artificial intelligence assistant of operating system OS. In this way, a developer can use interface AI_PI, for example, to find data in operating system OS with the help of the artificial intelligence assistant or to display a temporary work area combining several cards selected as relevant to a given context.

Interfaces TR_PI, DB_PI, and VE_PI are transclusion, database, and version system programming interfaces, respectively. These three interfaces are used to manage the transclusion functions of operating system OS, which allow for the transclusion of objects on a card. For automatic transclusion, the developer must add the object to the object database and include it in the version system so as to be able to refer back to the original object and not to one of its transclusions.

Interfaces SH_PI and NT_PI are programming interfaces for sharing and networking functions, respectively. Interface SH_PI manages the sharing of cards, objects, and tools. Interface NT_PI manages functions for connecting to a local area network and to the Internet, as well as security aspects of connections. Interface SH_PI handles the authorizations required for sharing a card or for the public transclusion of an object in cooperation with interface NT_PI and interface TR_PI.

Software component AI_ASSIST is the artificial intelligence assistant that is included in operating system OS. It is placed above the object system (OB_S in FIG. 1A) and works in concert with this system to find the most relevant and useful data for the user.

Assistant AI_ASSIST is provided to help the user to manage his/her data by finding data that appear to be the most relevant and useful to the user given the context. Assistant AI_ASSIST is placed above the object system and works in concert with this system to offer the user temporary, contextualized work areas. Each of these work areas is made of a set of cards gathered together by assistant AI_ASSIST depending on the context. Objects and tools are also selected and associated with the cards.

Assistant AI_ASSIST can also be called up by the user through tool palettes PAL and S_PAL when the user is working on a card that he/she created. In this way, the user receives help to identify additional information, objects, and tools, and/or other cards that could be relevant. Assistant AI_ASSIST can thus create for itself a temporary work area containing cards belonging to its universe and public cards, as well as any relevant information, plus objects and tools.

The KERNEL of operating system OS contains all the vital functions and components of the system represented by components OB_S, ODB_S, LK, OL_MGT, T_BD, VE_S, NT_PT_SH, I/O_MGT, and DRIV shown in FIG. 1A.

Higher software component OB_S is the object system. In reference to FIG. 1B as well, object system OB_S is in control of an object library management system, OL_MGT, which manages object library OL containing a plurality of objects, an object database system, ODB_S, which manages an object database ODB, and a link system LK_S, which manages a set of links LK between object library OL and object database ODB.

Object system OB_S has control over object library OL and object database ODB. Object system OB_S contains the data of object library OL and object database ODB. The objects are stored in object library OL and are linked, maintained, and shared by means of link system LK_S and object database ODB. Object database ODB maintains the locations of the original copies of the objects and the various instances of the objects. Object database ODB allows an object to exist in a plurality of instances when it is transcluded.

Link system LK_S, under the control of object system OB_S, manages link group LK containing deep bidirectional hypertext links established between objects.

As a general rule, object system OB_S has control over everything relating to objects. However, the tasks to be performed are distributed among other software components to allow for light and precise management. The life of an object is divided between object library OL and object database ODB, which are managed by object system OB_S.

The separation between the life of the object and its existence limits the risks of conflict and corruption. The object is not affected by the corruption of a link. In the event that an object might be affected, the links remain in place and object database ODB is not compromised, always pointing to the original imprint of the object which is contained in object database ODB and remains intact. In addition, if object library OL or object database ODB becomes corrupt, object system OB_S may go as far as to reconstitute an object by calling up various software components that work for the object system. These provisions make it possible to keep the impact of malfunctions on the user's work and data to a minimum.

Object system OB_S also plays the role of linkage between the higher visible layer of operating system OS and the underlying components. Object system OB_S also manages the creation of contextualized work areas in cooperation with artificial intelligence assistant AI_ASSIST, which helps the user manage his/her data. Object system OB_S will prepare the data, links, and objects that assistant AI_ASSIST needs to meet the user's needs. The work of assistant AI_ASSIST is facilitated by operating system OS itself. Queries are processed more quickly and then distributed in parallel among the various components of object system OB_S.

Note here that link system LK_S and link group LK managed by it, which are provided in operating system OS according to the invention, render the so-called "clipboard" device, which is present in known operating systems for implementing so-called "cut-and-paste" and "copy-and-paste" functions, unnecessary.

In reference especially to FIG. 1A, software component T_DB is the transclusion database with which version system VE_S is associated. Transclusion database T_DB ensures adequate flow of links between objects, cards, and tools. Database T_DB is located beneath the components of object system OB_S. Database T_DB manages the shallower links, which are usage links between objects or cards. This architecture bases operating system OS on several databases. Database ODB of object system OB_S manages links emanating from objects. Database T_DB manages links between objects. Object system OB_S can thus determine whether an object is linked and the number of times it is linked, so as to create for the object a corresponding imprint in object database ODB. Transclusion database T_BD knows what an object is linked to, how it is linked, and how many times it is linked. In this way, links benefit from redundancy, which makes it possible to protect data in the event that one of databases ODB or T_DB is compromised. In other words, object database ODB manages the link with its indication of origin and transclusion database T_DB adds the destination indication to the link. The version system makes it possible to know how many times an object has been transcluded, the locations of the transclusions, and the location where the original copy of the object is found, from which the first links emanated.

Software component NT_PT_SH contains the software components for network communication NT, public transclusions PT, and sharing SH, and manages all network calls by operating system OS. This software component NT_PT_SH is in charge of opening network communication ports, securing transclusions referred to here as "public," and sharing cards. Here, public transclusion is a transclusion made from a shared or public card to a private or public card. More specifically, apart from opening the necessary network communication ports, software component NT_PT_SH is also in charge of routing appropriate calls to object library OL and databases ODB and T_DB, as well as sending the appropriate orders to version system VE_S. Software component NT_PT_SH works jointly with transclusion database T_DB and version system VE_S, which are in charge of routing calls to object database ODB and object library OL. These calls between various layers allow for maximum protection of the objects and therefore the user's data. A link is created by transclusion database T_DB with object database ODB and object library OL before a call is made to network communication component NT, which will only accept a public transclusion or the sharing of a card in cooperation with components ODB and OL.

Software components I/O_MGT and DRIV form the lower layer of operating system OS, a lower layer in relation to the hardware configuration of computer 1, which is in charge of dialoging with said configuration. Component I/O_MGT is in charge of managing inputs/outputs and interrupts. Component DRIV contains all software drivers, which are in charge of managing the peripherals connected to computer 1, such as a printer, a keyboard, a graphical input device, a camera, etc.

In reference to FIGS. 2A, 2B to 5A, and 5B, zoom user interface 3D_ZUI of operating system OS will now be described through various examples of displays that are shown to the user on the screen of computer 1.

Figures 1B, 2A:
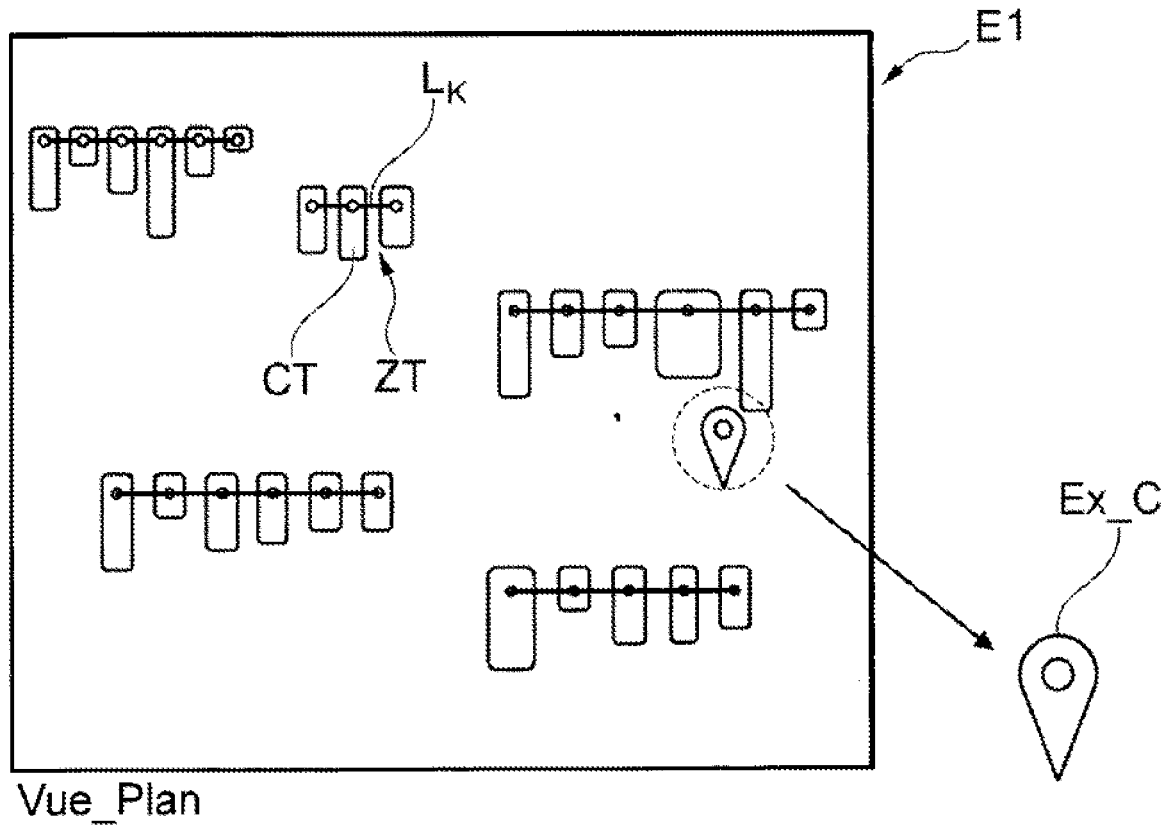
FIG. 1B is a schematic block diagram of an object system included in a kernel of the operating system of a computing device according to the invention.
FIGS. 2A and 2B show a simplified representation of the first and second display examples corresponding to first and second display modes, with zoom levels of 0% and 20%, respectively, in a computing device according to the invention.
Figure 2B:
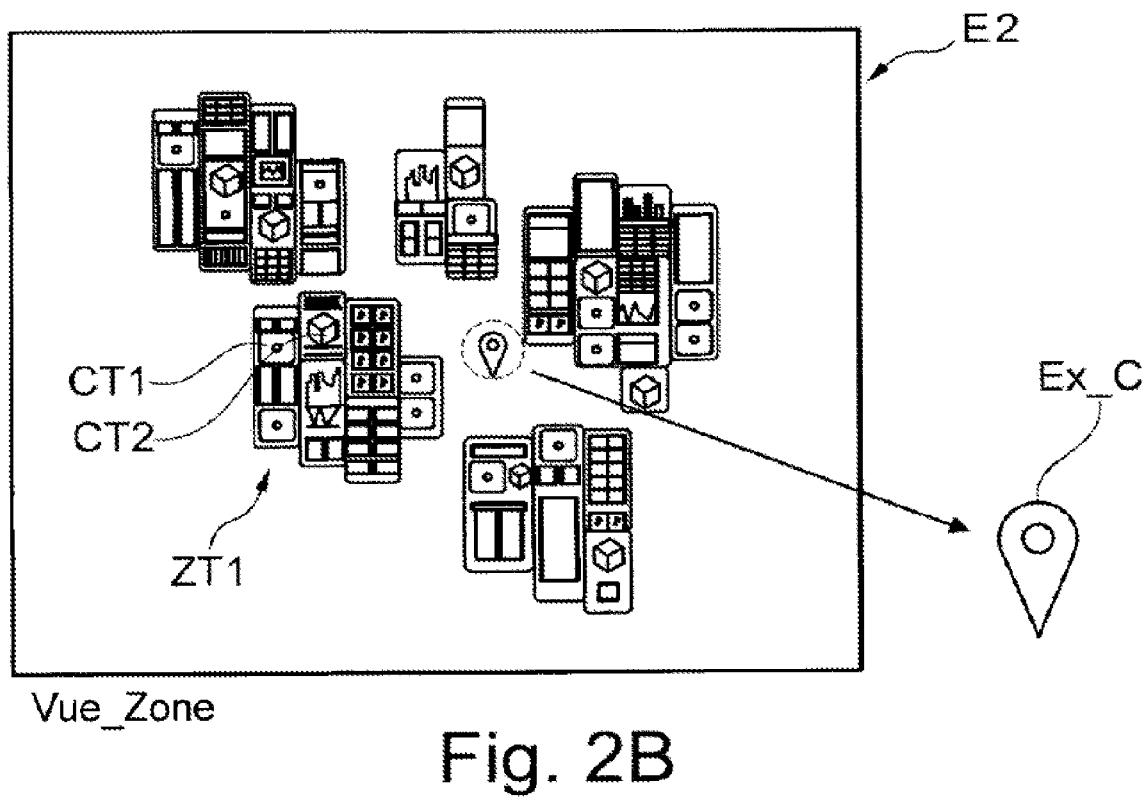

FIGS. 2A and 2B show a voluntarily simplified representation of the first and second display examples, E1 and E2, corresponding to first and second display modes with zoom levels of 0% and 20%, respectively, referred to as Vue_Plan [plan view] and Vue_Zone [zone view]. A first cursor Ex_C, referred to hereinafter as an "explore cursor," is associated with these Vue_Plan and Vue_Zone display modes, and is displayed on the screen with a specific graphic. The user positions explore cursor Ex_C on a point of interest by means of pointing device 113 (FIG. 1A) or a graphical input device, and controls his/her navigation in the Vue_Plan and Vue_Zone modes.

As shown in FIG. 2A, the Vue_Plan mode allows the user to locate his/her data appearing in the form of groups ZT and linked cards CT. In this Vue_Plan mode, links between cards CT are shown by links LK which are visible on the screen. The Vue_Plan mode provides a macroscopic view that allows the user to see the various groups ZT and identify one or more specific groups, essentially by the forms and configuration of the groups, with the content of cards CT not being very visible in this mode. In this mode, the user cannot act on his/her data, but can only move through groups ZT by means of explore cursor Ex_C.

As shown in FIG. 2B, the Vue_Zone mode provides the user with the possibility of distinguishing the content of cards CT. Thus, for example, for cards CT1 and CT2, it is possible to see that card CT1 includes two text objects and two video objects, with card CT2 including one text object and one 3D object. In this Vue_Zone mode, the user hovers over cards CT and has the possibility of organizing them by moving them, stacking them, creating links, and using them to form networks or grids of cards CT.

Figure 3A:
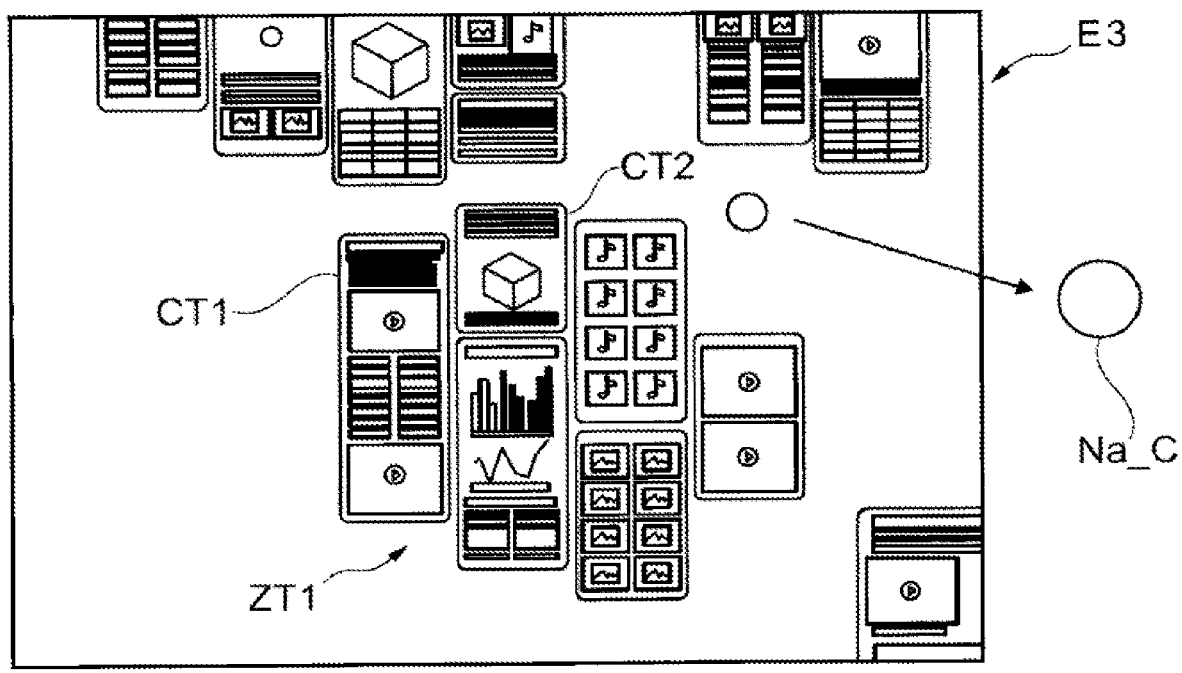
FIGS. 3A and 3B show a simplified representation of the third and fourth display examples corresponding to third and fourth display modes, with zoom levels of 40% and 60%, respectively, in a computing device according to the invention.
Figure 3B:
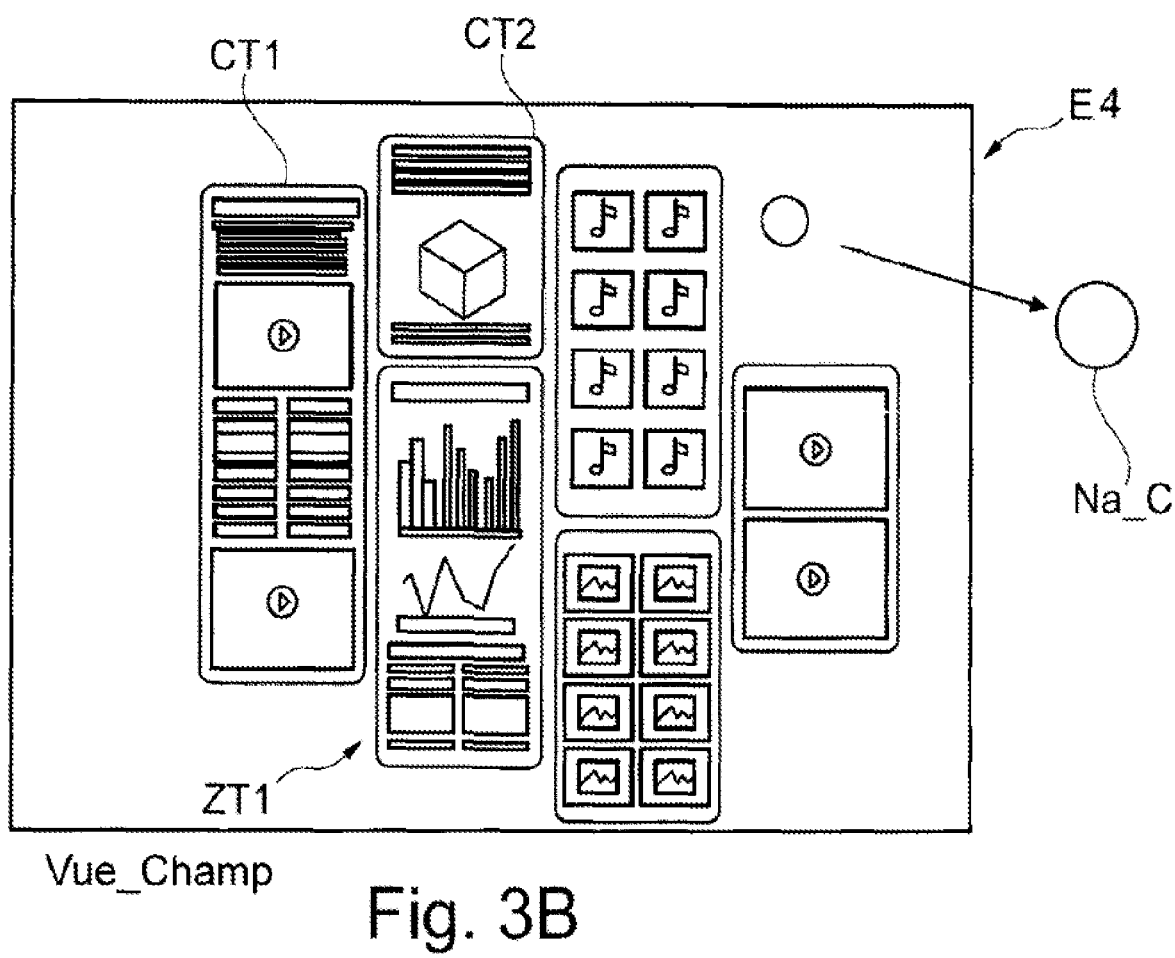

FIGS. 3A and 3B show a voluntarily simplified representation of the third and fourth display examples, E3 and E4, corresponding to third and fourth display modes with zoom levels of 40% and 60%, respectively, referred to hereinafter as Vue_Nav [navigation view] and Vue_Champ [field view].

A second cursor Na_C, referred to hereinafter as a "navigation cursor," is associated with these Vue_Nav and Vue_Champ display modes, and is displayed on the screen with a specific graphic. In these Vue_Nav and Vue_Champ display modes, cards CT are readable by the user but not editable. In a particular embodiment, cursor Na_C can adopt the shape of a hollow circle, as shown in FIGS. 3A and 3B, which grows larger or smaller depending on its distance from a card CT, with the objective being to help the user find a better position in the display space in relation to card CT.

In the Vue_Nav mode of FIG. 3A, the user can clearly recognize objects, for example a 3D object, video, or photo.

The text can be read starting with a certain character size, such as size 18. The titles appearing on cards CT can thus be read.

As shown in FIG. 3B, the Vue_Champ mode allows the user to explore his/her data very closely, but without being able to edit or use them. Contrary to known exploration systems in which the user must open a document in order to see what it contains, in operating system OS according to the invention, thanks to the zoom function the user consults the content of cards CT and objects by simply hovering over them.

FIGS. 4A and 4B show a voluntarily simplified representation of the fifth and sixth display examples, E5 and E6, corresponding to fifth and sixth display modes with zoom levels of 80% and 100%, respectively, referred to here as Vue_Lecture [read view] and Vue_Edition [edit view]. In these Vue_Lecture and Vue_Edition display modes, the user has the possibility of browsing over cards CT and consulting, transcluding, editing, or modifying the content thereof. A third cursor Ex_C, referred to hereinafter as an "edit cursor," is associated with these Vue_Lecture and Vue_Edition display modes, and is displayed on the screen with a specific graphic, here in the form of a simple vertical bar.

In the Vue_Lecture mode of FIG. 4A, the cards are editable, but without the tool palette being displayed on the screen in this particular embodiment. The Vue_Lecture mode is a transition mode between the Vue_Champ mode and the Vue_Edition mode. In this Vue_Lecture mode, the user can read the content of cards CT with precision before switching to the Vue_Edition mode, if the user wishes to modify or edit content.

In the Vue_Edition mode of FIG. 4B, tool palettes PAL and S_PAL are displayed and cursor Ed_C allows for interaction in the edit mode with cards CT and objects. Cards CT are at their maximum zoom level. If a user chooses to watch a video in full screen mode, the Vue_Edition mode is activated automatically.

In reference to FIGS. 5A and 5B, examples of a tool palette PAL and a sub-tool palette S_PAL will now be described. As a general rule, palettes and sub-palettes PAL and S_PAL are mobile so that the user can create a customized work space by moving them on the screen.

As shown in FIG. 5A, tool palette PAL comprises nine tools shown in the form of icons identified as items P1 to P9.

Tool P1 is a tool for adding a text box to a card CT. Activation of this tool P1 causes sub-tool palette S_PAL in FIG. 5B to appear. Sub-tool palette S_PAL is connected to the icon of tool P1 by a link. As shown in FIG. 5B, in this example sub-tool palette S_PAL comprises conventional tools (not labeled) needed for editing and formatting text, i.e. text alignment and justification, font selection, font size tools, and so forth.

As a general rule, in operating system OS according to the invention, sub-tool palettes S_PAL provide access to sub-tools or precision tools. The screen display of sub-tool palettes S_PAL appears as a function of the context, thus simplifying the user's actions. When one or more tools of a sub-tool palette S_PAL may be useful to the user in order to act on a selected object, sub-tool palette S_PAL is displayed on the screen.

Tool P2 is a tool for creating a new card. In the newly created card CT the user can then incorporate text, music, videos, 3D objects, links, and other items into the card.

Tool P3 is a tool for accessing the user's music collection and for creating new musical tracks and pieces. A sub-tool palette may be provided for this purpose and provide access, for example, to audio montage and mixing functions.

Tool P4 is intended for videos. By means of tool P4, the user can incorporate a video into card CT and immediately play it. A first sub-tool palette may be provided, for example, for accessing conventional montage functions, with a second sub-tool palette being provided for more complex functions intended for professionals.

Tool P5 is a tool for accessing photographs or images and adding one or more of them to card CT. A sub-tool palette can be provided, for example, to access retouching functions.

Tool P6 is a tool for incorporating a 3D object. Activation of tool P6 causes a geometric shape, such as a sphere, cube, or cone, to appear on the card. A sub-tool palette may be provided to access sculpture and texture functions, for example.

Tool P7 is a so-called "social" tool for sharing and communication which offers the user a function for searching through his/her contacts, as well as access to public cards CT. Tool P7 allows various users to link some of their cards CT together so as to create collaborative universes such as for work, exchanging, creating, playing, and other purposes.

Tool P8 provides access to system settings on which the user can act through a sub-tool palette.

Tool P9 is a tool allowing the user to call on the artificial intelligence assistant, for example to select and gather content likely to be of interest to the user or for other tasks, as mentioned earlier in this description.

Item P10 designates a box in tool palette PAL left available to the user. Box P10 is provided, for example, to allow the user to place a frequently used or user-created tool. One or more tools can thus be added to the palette, with the system always adding an empty box P10 to the total number of boxes in palette PAL occupied by tools.

Naturally, the invention is not limited to the particular embodiments that have been described here as examples. Depending on the applications of the invention, a person skilled in the art may make various modifications and variants which fall within the scope of the claims included herein.

The invention claimed is:

1. A method for operating a computing device (1) comprising:
   a central processing unit (10),
   man-machine interface means (11) including a display screen (110), an operating system (OS) including a graphical user interface (3D_ZUI),
   an object system (OB_S) contained in a kernel (KERNEL) of said operating system (OS) and including an object library (OL_MGT, OL), an object database (ODB_S, ODB) and a link system (LK_S),
   a transclusion database (T_DB) contained in said kernel (KERNEL) of said operating system (OS) and with which is associated a version system (VE_S), said method comprising:
   an implementation, in said graphical user interface, of a first graphical user interface metaphor in the form of a zoomable space appearing on said display screen (110) and a second graphical user interface metaphor in the form of a card (CT) contained in said zoomable space, and
   a display in said cards of graphical representations corresponding to various types of digital objects (OB1, OB2) as a function of a plurality of links (LK, $L_K$) between said objects (OB1, OB2) and said cards (CT), with said plurality of links (LK, $L_K$) being established between said objects (OB1, OB2) and said cards (CT)

by at least some interactions through said graphical user interface between a user and the operating system (OS), and management by the link system (LK_S) of the plurality of links (LK, $L_K$) between said object library (OL_MGT, OL) and said object database (ODB_S, ODB), said plurality of links (LK) comprising hypertext links, and ensuring by the transclusion database (T_DB) an adequate transmission of said links (LK) between said objects (OB1, OB2), said cards (CT), and the software tools (P1 to P9).

2. A method according to claim 1, characterized in that said various types of digital objects (OB1, OB2) comprise at least text and/or a 3D object and/or a sound and/or a video and/or a graphic and/or a spreadsheet.

3. A method according to claim 1, characterized in that said objects (OB1, OB2) have said graphical representations which reveal a nature of said objects and/or a content thereof.

4. A method according to claim 1, characterized in that said graphical user interface (3D_ZUI) comprises a plurality of display modes (Vue_Plan, Vue_Zone; Vue_Nav, Vue_Champ; Vue_Lecture, Vue_Edition; E1, E2; E3, E4; E5, E6) corresponding to different zoom levels (0%, 20%; 40%, 60%; 80%, 100%) in said zoomable space, at least a first display mode (Vue_Plan, Vue_Zone; E1, E2) enabling a macroscopic display of at least one card (CT) and/or one group of cards (ZT1) and/or a link ($L_K$) between two said cards (CT) by means of a first cursor (Ex_C).

5. A method according to claim 4, characterized in that said graphical user interface (3D_ZUI) comprises at least a second display mode (Vue_Plan, Vue_Zone; E3, E4) enabling an exploration of the content of at least one said card (CT) and/or a group of cards (ZT1) and/or one said object (OB1, OB2) by means of a second cursor (Na_C).

6. A method according to claim 5, characterized in that said graphical user interface (3D_ZUI) comprises at least a third display mode (Vue_Lecture, Vue_Edition; E5, E6) enabling read and/or edit access to said objects (OB1, OB2) by means of a third cursor (Ed_C).

7. A method according to claim 6, characterized in that it also comprises an implementation of a second graphical user interface metaphor in the form of a tool palette (PAL) that is displayed in said zoomable space as a function of the context in said at least one third display mode, said tool palette (PAL) comprising icons (P1 to P9) corresponding to software tools for interacting with the cards (CT) and said objects (OB1, OB2) according to actions by said user.

8. A method according to claim 7, characterized in that it also comprises the implementation of a third graphical user interface metaphor in the form of a sub-tool palette (S_PAL) being displayed in said zoomable space in said at least one third display mode, with the display of said sub-tool palette (S_PAL) being controlled by an action by said user on a corresponding icon (P1 to P9) on said tool palette (PAL).

9. A computing device comprising a central processing unit (10), man-machine interface means (11) including a display screen (110), and an operating system (OS) including a graphical user interface (3D_ZUI), characterized in that the computing device also comprises a plurality of means for implementing the operating method according to claim 1.

10. A computing device according to claim 1, characterized in that said plurality of means also comprises software means for network communication (NT), public transclusion (PT), and sharing (SH), which are contained in said kernel (KERNEL) of said operating system (OS) and which are responsible for opening network communication ports, securing public transclusions, and sharing said cards (CT).

11. A computing device according to claim 1, characterized in that said zoom user interface (3D_ZUI) is an organic type that calls upon software means for animation (ANIM_CP), scaling (SCAL_CP), and zoom effect management (ZOOM_CP) which are contained in said operating system (OS).

12. A computing device according to claim 11, characterized in that said zoom user interface (3D_ZUI) also calls upon software means of three-dimensional display (3D_CP) which are contained in said operating system (OS).

13. A computing device according to claim 1, characterized in that it comprises in said operating system (OS) means (PROG_INT) comprising a plurality of programming interfaces (CD_PI, AN_PI, Z_PI, 3D_PI, TP_PI, OB_PI, AI_PI, TR_PI, DB_PI, VE_PI, SH_PI, NT_PI).

14. A computing device according to claim 1, characterized in that it comprises in said operating system (OS) software means for an artificial intelligence assistant (AI_ASSIST).

15. A computer program constituting the operating system (OS) of the computing device according to claim 1, comprising program code instructions when said instructions are executed by a processor (µP) of said computing device (1).

* * * * *